United States Patent [19]

Parks

[11] 4,061,364
[45] Dec. 6, 1977

[54] LEAF SPRING SUSPENSION SYSTEM

[75] Inventor: Robert R. Parks, Warren, Mich.

[73] Assignee: General Motors Corporation, Detroit, Mich.

[21] Appl. No.: 681,540

[22] Filed: Apr. 29, 1976

[51] Int. Cl.² .................................................. B60G 11/04
[52] U.S. Cl. ................................... 280/718; 267/54 A; 280/669
[58] Field of Search ............... 280/718, 680, 720, 669; 267/54 A

[56] References Cited

U.S. PATENT DOCUMENTS

| | | | |
|---|---|---|---|
| 1,643,258 | 9/1927 | Richter | 267/54 A X |
| 1,766,882 | 6/1930 | Chryst | 267/54 A X |
| 1,789,725 | 1/1931 | Chilton | 267/54 A X |
| 2,635,869 | 4/1953 | Jurgens | 267/54 A X |
| 2,831,674 | 4/1958 | Brown | 267/54 A |
| 2,932,507 | 4/1960 | Muller | 267/54 A |
| 3,024,038 | 3/1962 | Butler | 267/54 A X |
| 3,596,923 | 8/1971 | Nakamura | 280/718 |

Primary Examiner—John P. Silverstrim
Attorney, Agent, or Firm—John P. Moran

[57] ABSTRACT

A leaf spring suspension system including a compliant front leaf spring hanger assembly for supporting the front end of the longest or main leaf spring and operatively connecting same to the vehicular side rail, the hanger assembly including a pair of oppositely disposed, cup-shaped rubber bushings surrounding the front spring-eye and being confined in a preloaded manner within the hanger housing for permitting lateral and longitudinal movement of the front end of the main leaf spring in response to any side load exerted on the leaf spring stack for improved lateral force compliance characteristics during vehicular turns.

4 Claims, 4 Drawing Figures

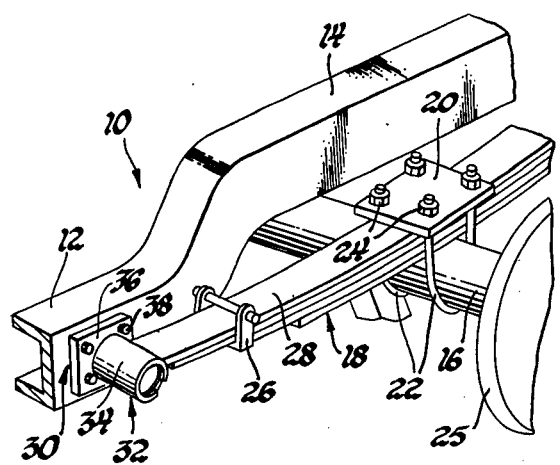
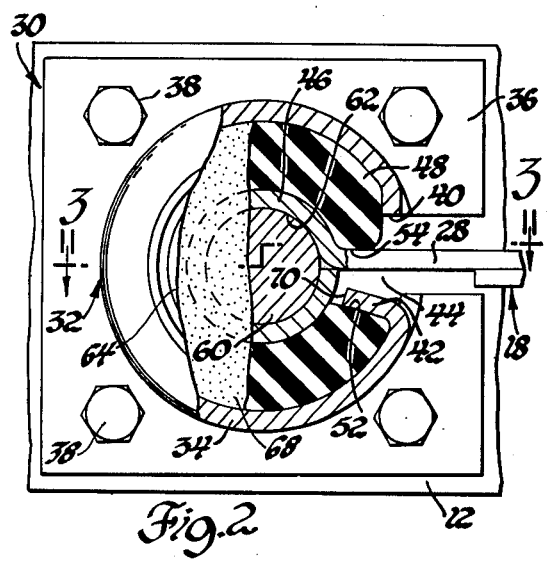

LEAF SPRING SUSPENSION SYSTEM

This invention relates generally to suspension systems for motor vehicles and, more particularly, to rear leaf springtppe suspension systems.

It is desirable for any automotive suspension system to provide a smooth ride over various road conditions, as well as good handling characteristics during turns and lane changing, for example. The amount of steering correction that an operator must make while negotiating turns is partly dependent upon lateral force compliance steer characteristics of the front and rear suspensions. This invention provides a new means of improving the lateral force compliance steer feature of the rear suspensions.

Accordingly, a general object of the invention is to provide a leaf spring suspension system which provides improved lateral force compliance steer characteristics during vehicular turns.

Another object of the invention is to provide an improved rear leaf spring suspension system including a compliant hanger assembly which permits the front end of the main leaf spring to move both laterally and longitudinally with respect to the adjacent frame side rail in response to lateral forces encountered thereby.

A further object of the invention is to provide an improved rear leaf spring suspension system including a hanger assembly having an open-sided deep-drawn cup-type housing secured to the frame side rail, with the main leaf spring front spring eye-end resiliently mounted therein, extending through the open side of the hanger cup, the spring eye-end being confined at the outer peripheral surface and the ends thereof within a pair of oppositely disposed cup-shaped rubber bushings which, in turn, are confined within the hanger cup and preloaded by the assembly of the hanger housing to the side rail. The preloaded rubber bushings permit both lateral and longitudinal movement of the spring eye-end, during vehicular turns particularly, to thereby provide improved lateral force compliance steer characteristics.

These and other objects and advantages of the invention will be apparent when reference is made to the following description and accompanying drawings, wherein:

FIG. 1 is a fragmentary perspective view of a vehicular frame side rail and associated wheel and axle arrangement embodying the inventive leaf spring suspension system;

FIG. 2 is a fragmentary side view of a vehicular frame side rail embodying the invention;

FIG. 3 is a fragmentary cross-sectional view taken along the plane of line 3—3 of FIG. 2, and looking in the direction of the arrows; and FIG. 4 is an exploded perspective view of the leaf spring hanger assembly embodied in the invention.

Referring now to the drawings in greater detail, FIG. 1 illustrates the left one of two rear leaf suspension systems 10, for use on vehicles having the usual frame side rail 12, with an upwardly bowed portion 14 traversing over the rear axle 16. The suspension system 10 includes a conventional leaf spring stack 18 securely confined at an intermediate point therealong against the rear axle 16 by a plate 20 and oppositely disposed U-bolts 22 and nuts 24, intermediate each side rail 12 and each adjacent rear wheel 25. An additional clamping member 26 may be employed intermediate the plate 20 and an end of the leaf springs 18 to keep the individual springs aligned. A conventional shackle [not shown] is used to secure the rear end of the uppermost or main leaf spring 28 to the outboard side of the side rail 12, providing for pivotal movement of the main spring 28 about its rear spring eye, but not providing for any lateral movement thereof.

A leaf spring hanger assembly 30 supports the forward end of the main leaf spring 28 of the leaf spring stack 18, and serves to operatively connect same to the vehicular frame side rail 12 in a manner such that the lateral force compliance steer characteristic is greatly improved, as will be explained.

The assembly 30 includes a cylindrical hanger 32 formed as a deep-drawn cut 34 having a mounting flange 36 formed on one end thereof. The flange 36 is connected by bolts 38 to the outer side surface of the frame side rail 12. A slit 40 is formed along the length of one side of the cup 34, with one edge portion thereof bent inwardly to form a retainer lip 42 and to provide a lateral opening 44 for the extension therethrough of the main leaf spring 28.

The cylindrical spring eye-end 46 of the main leaf spring 28 is mounted centrally within the hanger cup 34, and retained for resilient movement therein by a pair of oppositely disposed cup-shaped rubber bushings 48 confining the outer peripheral surface and both end faces of the spring eye-end 46. The rubber bushings 48 are, in turn, confined at their respective outer surfaces by the inner surface of the hanger cup 34. A slot 50 is formed along the full length of a side of each of the rubber bushings 48 to accommodate the extension therethrough of the main leaf spring 28. One edge 52 (FIG. 2) of each slot 50 abuts against the retainer lip 42, while the other edge 54 thereof abuts against the main leaf spring 28. The bushing end walls 56 and 58 are preloaded by the assembly of the mounting flange 36 to the side rail 12, and a metal plug 60 is press-fitted into the eye opening 62 of the end 46 of the main leaf spring 28 to provide solid end areas for cooperation with the bushing end walls 56 and 58. The components just described are retained axially within the hanger cup 34 by an end-cap 64 (FIG. 3) positioned just inside an internal retainer flange 66 formed on the end of the hanger cup 34 opposite the mounting flange 36, the end-cap 64 serving to provide a solid flat surface for abutment thereagainst of the outer face 68 of the outermost rubber bushing 48.

It is apparent that under side load conditions the spring eye-end 46 of the main leaf spring 28 will move to further compress one or the other of the preloaded end walls 56 and 58 (FIG. 3) to move toward or away from the frame side rail 12.

Specifically, when a vehicle is maneuvered into a left turn, for example, the reaction on the rear axle 16 is toward the left of the vehicle, as a result of centrifugal force on the vehicular body. There would result from such reaction a leftward force on the leaf spring stack 18, as a result of the leaf spring stack 18 being secured at an intermediate point therealong to the axle 16 by the conventional plate 20 and U-bolt 22 type clamping member. Inasmuch as the rear end of the main leaf spring 28 is retained against lateral movement thereof by the conventional shackle, the leftward force on the stack 18 urges the resiliently mounted front end of the main leaf spring 28 outwardly from the side rail 12, compressing the end wall 56 of the outer rubber bushing 48. Such outward movement of the front spring eye-end 46 causes the left rear wheel 25 to pivot about a vertical axis through the midpoint of the axle 16 and to thus be positioned a little behind its normal straight-away location with respect to the frame, thereby creating an advantageous lateral force compliance steer of the wheel 25 with respect to the automobile body. Rearward movement of the main leaf spring 28, with respect to the side rail 12, would be limited by the spring eye-end 46 abutting against the inner edge 70 of the retainer lip 42.

The reaction on the right rear wheel during the left turn is the opposite of that on the left rear wheel, creating the advantageous lateral force compliance steer of the right wheel with respect to the automobile body. Such lateral force compliance would supplement forces due to roll and aligning torque characteristics, and facilitate handling of the vehicle during turns and lane changing conditions.

While but one embodiment of the invention has been shown and described, other modifications thereof are possible.

I claim:

1. A compliant hanger mechanism for use on a vehicle having a side frame having a side surface, a pair of rear wheels, a rear axle mounting said rear wheels, a set of leaf springs mounting said rear axle, said leaf spring set including a main leaf spring and a spring eye-end at the end of said main leaf spring; said hanger mechanism comprising: a housing; a mounting flange on one end of said housing; means for fastening said mounting flange to said side surface; a slot extending along the side of said housing; rubber bushing means within said housing, said bushing means including two end portions, side portions extending from said end portions, and a slot extending along said side portions in alignment with said housing slot whereby said main leaf spring extends through said slots with said spring eye-end retained within said bushing means; and means on the other end of said housing for retaining said bushing means therein, whereby said fastening means preloads said bushing means within said housing with one of said ends of said bushing means engaging said retaining means and the other of said ends of said bushing means engaging said side surface to permit a predetermined lateral movement of said spring eye-end to provide lateral force compliance steer of said rear wheels.

2. For use with a motor vehicular frame and associated rear axle and rear wheels, and a rear leaf spring stack operatively connected to said frame and said rear axle and including a main leaf spring having a spring eye formed at the front end thereof, a main leaf spring compliant hanger mechanism comprising a pair of oppositely disposed abutting cup-shaped rubber bushings, each having a slot formed along one side thereof, said front spring eye-end of said main leaf spring being mounted within said bushings and extended through said slot, a hanger housing having a slot formed along a side thereof in alignment with said slots in said bushings and mounted around said cup-shaped rubber bushings at all cylindrical surfaces and at one end surface thereof, and a mounting flange formed on said hanger housing at the end thereof adjacent the other unconfined end surface of said rubber bushings, said rubber bushings being preloaded by a predetermined compression thereof upon assembly of said mounting flange on a side surface of said vehicular frame, said preloaded rubber bushings permitting a predetermined lateral movement of said front spring eye-end of said main leaf spring either toward or away from said vehicular frame to provide lateral force compliance steer of said rear wheels.

3. For use with a motor vehicle having a frame including oppositely disposed side rails and a rear axle having oppositely disposed, non-steerable wheels mounted thereon, and a set of leaf springs extending alongside said adjacent side rail of said frame, said set of leaf springs including a main leaf spring having a cylindrical spring eye opening formed on each end thereof, compliant bracket means operatively connected between said side rail and the front end of said main leaf spring at said cylindrical spring eye opening thereof and comprising a housing, a mounting flange formed on one end thereof, a retainer flange formed on the other end thereof, fastener means for securing said mounting flange to a side surface of said side rail, a lateral opening formed along a side of said housing for the extension therethrough of said main leaf spring such that said cylindrical spring eye opening is located within said housing, and a pair of oppositely disposed rubber bushings confined by said housing and being preloaded between said retainer flange and said adjacent side rail, each of said rubber bushings having a slotted opening formed along the length of one side thereof for the extension therethrough of said main leaf spring, said bushings adapted to encase said front end of said main leaf spring and permit lateral movement within predetermined limits of said front end of said main leaf spring as a result of lateral force on the body of said motor vehicle and the resultant forces and/or moments applied to said rear wheels at the point of contact with the road surface, to provide an improved lateral force compliance steer of said rear wheels during turning operations.

4. For use with a motor vehicle having a frame including oppositely disposed side rails and a rear axle having oppositely disposed, non-steerable wheels mounted thereon, and a leaf spring stack extending alongside each of said side rails, each of said leaf spring stacks including a main leaf spring having a cylindrical spring eye opening formed on each end thereof, compliant bracket means operatively connected between each of said side rails and the front end of said main leaf springs at said cylindrical spring eye opening thereof and comprising a cylindrical housing, an external mounting flange formed on one end thereof, an internal retainer flange formed on the other end thereof, a disc retained by said internal retainer flange in said cylindrical housing, fastener means for securing said external mounting flange to a side surface of one of said side rails, a longitudinal slit formed along a side of said cylindrical housing, one edge of said longitudinal slit being bent inwardly to form an internal abutment along the length of said longitudinal slit and to provide a lateral side opening in said cylindrical housing, said front end of said main leaf spring extending through said lateral side opening such that said cylindrical spring eye opening is substantially concentrically located within said cylindrical housing, a pair of oppositely disposed rubber cups, each having one closed end and a slotted opening formed along the length of one side thereof for the extension therethrough of said main leaf spring, said rubber cups being mounted around opposite ends of said front end of said main leaf spring within said cylindrical housing such that one edge of said slotted opening abuts against said internal abutment and the other end of said slotted opening abuts against the adjacent surface of said main leaf spring, said rubber cups being preloaded between said disc and said adjacent side rail by the assembly of the external mounting flange to said side rail surface, and a metal plug mounted within said cylindrical spring eye opening to provide oppositely disposed solid end surfaces in contact with said closed ends of said rubber cups, said rubber cups permitting some lateral and longitudinal movement of said front end of said main leaf spring with respect to said adjacent side rails as a result of the action of lateral and/or centrifugal forces on the body of said motor vehicle and the resultant forces applied to said rear wheels at the point of contact with the road surface, said lateral movement of said front end of said main leaf spring providing an improved lateral force compliance steer of said rear wheels during turning operations, and said longitudinal movement of said front end of said main leaf spring being limited by contact of said front end with said internal abutment.

* * * * *

UNITED STATES PATENT AND TRADEMARK OFFICE
CERTIFICATE OF CORRECTION

PATENT NO. : 4,061,364
DATED : December 6, 1977
INVENTOR(S) : Robert R. Parks

It is certified that error appears in the above-identified patent and that said Letters Patent are hereby corrected as shown below:

Column 2, line 14, "cut" should read -- cup --.

Signed and Sealed this

Thirtieth Day of May 1978

[SEAL]

Attest:

RUTH C. MASON
Attesting Officer

LUTRELLE F. PARKER
Acting Commissioner of Patents and Trademarks